United States Patent
Dangy-Caye

(10) Patent No.: US 9,049,043 B2
(45) Date of Patent: Jun. 2, 2015

(54) METHOD AND DEVICE FOR REDUCING THE ELECTRICAL CONSUMPTION OF AN ETHERNET INTERFACE

(75) Inventor: Nicolas Dangy-Caye, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 678 days.

(21) Appl. No.: 13/265,779

(22) PCT Filed: Apr. 16, 2010

(86) PCT No.: PCT/EP2010/055038
§ 371 (c)(1),
(2), (4) Date: Oct. 21, 2011

(87) PCT Pub. No.: WO2010/121965
PCT Pub. Date: Oct. 28, 2010

(65) Prior Publication Data
US 2012/0042189 A1  Feb. 16, 2012

(30) Foreign Application Priority Data
Apr. 22, 2009  (FR) .................................. 09 52627

(51) Int. Cl.
*H04L 12/40*  (2006.01)
*G06F 1/32*  (2006.01)

(52) U.S. Cl.
CPC ........ *H04L 12/40039* (2013.01); *G06F 1/3209* (2013.01); *G06F 1/3278* (2013.01); *Y02B 60/126* (2013.01); *Y02B 60/32* (2013.01); *Y02B 60/35* (2013.01)

(58) Field of Classification Search
CPC .......................................... Y02B 60/34–60/35
USPC ................... 713/320; 370/230, 328, 445, 528
See application file for complete search history.

(56) References Cited

U.S. PATENT DOCUMENTS

| | | | |
|---|---|---|---|
| 6,993,667 B1 | 1/2006 | Lo | |
| 8,127,164 B2 * | 2/2012 | Diab et al. | 713/324 |
| 8,255,010 B2 * | 8/2012 | Cheng et al. | 455/574 |
| 2003/0206564 A1 | 11/2003 | Mills et al. | |
| 2004/0228275 A1 | 11/2004 | Costo et al. | |
| 2013/0329637 A1 * | 12/2013 | Kodali et al. | 370/328 |

FOREIGN PATENT DOCUMENTS

EP  1168717  1/2002

OTHER PUBLICATIONS

International Search Report for PCT/EP2010/055038, mailed May 26, 2010.

(Continued)

*Primary Examiner* — Brian Misiura
(74) *Attorney, Agent, or Firm* — Nixon & Vanderhye, PC

(57) ABSTRACT

The present invention relates to a method for reducing the electricity consumption of an Ethernet interface involving switching to a low power mode when no activity is detected on the physical layer thereof for a first predetermined duration (T_L1_INACTIVE). The method is characterized in that the interface also switches to a low power mode when no activity is detected on the MAC layer thereof for a second predetermined duration (T_L2L).

18 Claims, 4 Drawing Sheets

(56) References Cited

OTHER PUBLICATIONS

Figure 1:
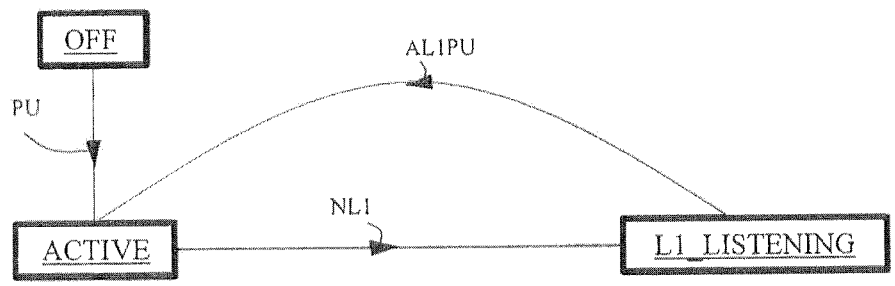

Foreign-language Written Opinion of the international Searching Authority for PCT/EP2010/055038, mailed May 26, 2010.

International Preliminary Examination Report issue in International Application No. PCT/EP2010/055038 dated Nov. 10, 2011 and an English Translation of the Written Opinion.

* cited by examiner

METHOD AND DEVICE FOR REDUCING THE ELECTRICAL CONSUMPTION OF AN ETHERNET INTERFACE

This application is the U.S. national phase of International Application No. PCT/EP2010/055038, filed 16 Apr. 2010, which designated the U.S., and claims priority to FR application Ser. No. 09/52627, filed 22 Apr. 2009, the entire contents of which is hereby incorporated by reference.

The present invention concerns a method for reducing the electrical consumption of an Ethernet interface.

An Ethernet interface is hosted by an item of equipment for the purpose of exchanging signal frames with another Ethernet interface hosted by another distant item of equipment connected to the first item of equipment by a cable.

An Ethernet interface groups together a set of functionalities that are implemented at two layers: the physical layer and the MAC (Medium Access Control) layer. These functionalities of the physical and MAC layers are implemented by hardware means that, for the physical layer, are normally in the form of a set of electronic components referred to as an "Ethernet physical chipset" and for the MAC layer in the form of a processor.

Activation and deactivation of an Ethernet interface will be spoken of hereinafter. The Ethernet interface will be said to be active when the hardware means of its physical layer and MAC layer are supplied electrically. The Ethernet interface will then be in a position to exchange data frames with a distant interface. The Ethernet interface will be said to be inactive when the hardware means of its physical layer are not supplied electrically.

Activity on the physical layer and on the MAC layer of an Ethernet interface will also be spoken of hereinafter in order to express the fact that signal frames are received or sent by the Ethernet interface.

The electrical supply to the hardware means of the physical layer and MAC layer of an Ethernet interface causes electrical consumption which, although essential when the Ethernet interface is liable to exchange signal frames carrying useful data, may be reduced when the equipment that hosts it is not powered up and the link that connects it to a distant Ethernet interface is broken.

The majority of current equipment that hosts an Ethernet interface uses a so-called energy detect functionality. This functionality reduces the electrical consumption of an Ethernet interface by switching from an active mode, that is to say a mode in which the interface is active, to an inactive mode in which the interface in inactive, when inactivity is detected on its physical layer for a predetermined period. Moreover, when an activity is detected on its physical layer, the interface switches from inactive mode to active mode.

The patent applications U.S. Pat. No. 6,993,667 and U.S. Pat. No. 7,278,039 describe the use of such a functionality, the functioning of which is summarised in relation to FIG. 1.

FIG. 1 shows a state diagram relating to the functioning of an Ethernet interface of the prior art that uses the energy detect functionality.

The Ethernet interface functions according to three modes: powered down referred to as OFF, active referred to as ACTIVE or inactive referred to as L1_LISTENING.

In OFF mode, the interface is powered down and therefore consumes no electrical energy. This mode corresponds in particular to when the equipment is switched off. When the equipment that hosts the interface is powered up, a PU event, the interface switches into ACTIVE mode in which the interface is activated. The interface then attempts to establish an Ethernet link with another distant Ethernet interface hosted by another item of equipment, during a phase of negotiation between distant Ethernet interfaces. Such a phase may be in accordance with the standard 802.3 clause 28.

Once the Ethernet link is established, the interfaces are then configured for any exchanges of signal frames between the two items of equipment.

When inactivity on the physical layer of the Ethernet interface is detected for a predetermined period T_LI_INACTIVE, the interface switches from active mode to L1_LISTENING mode, in which the Ethernet interface is deactivated. Means consuming little electrical energy are then used to detect any activity on the physical layer of the Ethernet interface.

When an Ethernet interface is inactive, its consumption is therefore reduced compared with what it consumes when it is active. Functioning of the interface in low consumption mode is sometimes spoken of because only the means for detecting any activity on the physical layer thereof remain supplied with electricity when the Ethernet interface is inactive.

The Ethernet interface switches from L1_LISTENING mode to ACTIVE mode when an activity of its physical layer has been detected (AL1 event) or when an activation instruction (WU event) has been sent by a protocol layer of the host equipment.

An Ethernet link is then established between distant interfaces and exchanges of signal frames between equipment can start as explained above.

The Ethernet interface switches from ACTIVE mode or L1_LISTENING mode to OFF mode when the host equipment is powered down.

An Ethernet interface hosted by an item of equipment implementing the energy detect functionality described in relation to FIG. 1 therefore saves on electrical energy when inactivity on the physical layer of the Ethernet interface is detected for a predetermined period and activates this interface as soon as activity of its physical layer is detected or an activation instruction emanates from the host equipment.

However, implementation of the energy detection functionality is not efficient where the equipment is on standby. This is because, when no signal frame carrying useful data is exchanged on an Ethernet link connecting two interfaces, the two Ethernet interfaces all the same exchange signal frames (usually referred to as IDLE), which generate activity on the physical layers thereof and which, consequently, do not enable these interfaces to switch from ACTIVE mode to L1_LISTENING mode. Thus, although there is no useful data traffic between these two Ethernet interfaces, these interfaces consume residual electrical energy. This consumption, a few hundreds of milliwatts per interface, is not insignificant over a long period such as for example over a nocturnal period.

Figure 2:
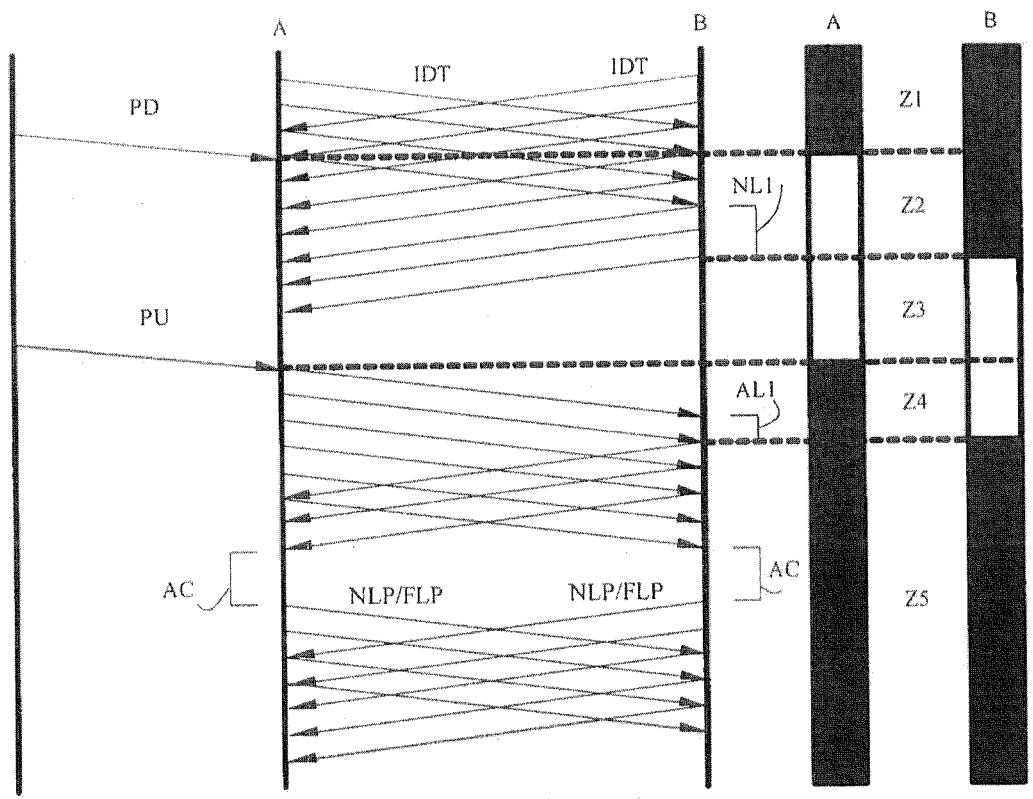

The energy detect functionality is therefore suitable only for reducing the energy consumption of the Ethernet interfaces when the cable connecting these interfaces is broken or one of the items of host equipment on an established Ethernet link is powered down as illustrated in FIG. 2.

FIG. 2 shows a timing diagram that illustrates the functioning of an Ethernet interface implementing a method of reducing the electrical consumption of an Ethernet interface according to the prior art.

Two items of equipment A and B are considered. These items of equipment A and B exchange signal frames that are represented by parallel lines terminating in arrows to indicate their transmission direction.

On the right in FIG. 2, the consumption of each item of equipment A and B hosting respectively an Ethernet interface ETHA and ETHB is shown. The black areas represent the case where the Ethernet interface of an item of equipment functions in ACTIVE mode and the not filled in (white) areas represent the case where the Ethernet interface functions in L1_LISTENING or OFF mode.

Let us consider now that the equipment A is powered down or the Ethernet cable connecting the interfaces ETHA and ETHB is broken (event PD). Let us take the case where the ETHA interface switches from ACTIVE mode to OFF mode. It can also be envisaged that the interface ETHB switches first to OFF mode without for all that modifying the principle of the energy reduction functioning of these interfaces described below.

The hardware means of the physical layer and of the MAC layer of the interface ETHA are then no longer supplied with electricity and the interface ETHA therefore no longer sends any IDT frames. The interface ETHA then functions in a low consumption mode while the interface ETHB continues to function in a nominal consumption mode given that it is still functioning in ACTIVATE mode (zone Z2).

As from the time when the Ethernet interface ETHB no longer receives a frame IDT from the Ethernet interface ETHA, the Ethernet interface ETHB detects that there is no longer any activity on its physical layer and initiates a counter NL1 initialised to the period T_L1_INACTIVE as from the last IDT frame received. It can be noted that, during this period, the interface ETHB functions in ACTIVATE mode and continues to send IDT frames while listening whether it is receiving an IDT frame in order to detect any activity on its physical layer.

At the expiry of the period T_L1_INACTIVE, the Ethernet interface ETHB switches from ACTIVATE mode to L1_LISTENING mode, that is to say into a low-consumption mode (zone 3).

Let us consider now that the equipment A is switched on again by action for example on a button or by an instruction sent by a protocol layer of the host equipment (event PU). The interface ETHA then switches from OFF mode to ACTIVATE mode and initiates a phase of negotiation of the Ethernet link by sending NPL/FLP frames. The interface ETHB is still in L1_LISTENING mode (zone 4).

The interface ETHB detects activity on its physical layer (event AL1) and then switches from L1-LISTENING mode to ACTIVATE mode in order to respond to the negotiation phase initiated by the interface ETHA.

The two interfaces ETHA and ETHB then function in ACTIVATE mode, continue the negotiation phase and establish the Ethernet link (event AC). The two interfaces then function in their nominal mode illustrated here by the exchange of IDT frames (zone 5).

As has just been seen, use of the energy detect functionality by detection of inactivity on the physical layer of the Ethernet interface makes it possible to optimise the consumption of such an interface when the distant interface is no longer supplied or the cable is broken. On the other hand it does not make it possible to optimise the consumption of two interfaces sending IDT frames, that is to say without any effective traffic (zone 1). In addition, an Ethernet interface that functions in a low-consumption mode cannot activate another interface since, according to the prior art, the latter can be activated only by a local action (pressing on button, remote control) on the equipment that hosts it.

The problem solved by the present invention is also remedying these drawbacks.

To this end, the invention concerns a method of reducing the electrical consumption of an Ethernet interface switching into a low-consumption mode by detection of inactivity on its physical layer during a first predetermined period. The method is characterised in that the interface also switches into a low-consumption mode by detection of inactivity on its MAC layer during a second predetermined period.

Thus the present invention consists in general terms of detecting the activity on the MAC layer of an Ethernet interface. If no frame has been received at the MAC layer, the interface then considers that the frames received are IDT frames and stops sending these frames. The distant interface ETHB then no longer receives any IDT frame and also switches into a low-consumption mode.

Introduction of the transient mode thus optimises the electrical consumption of the interface when the host equipment is on standby.

In addition, as will be seen subsequently, the two distant interfaces are then in a low-consumption mode but can now each be activated either at a distance by the other interface or by an event emanating from a layer with a level higher than that of the MAC layer.

According to the hardware aspects thereof, the present invention concerns a device for reducing the electrical consumption of an Ethernet interface and an item of equipment that hosts an Ethernet interface and such a device.

Figure 3:
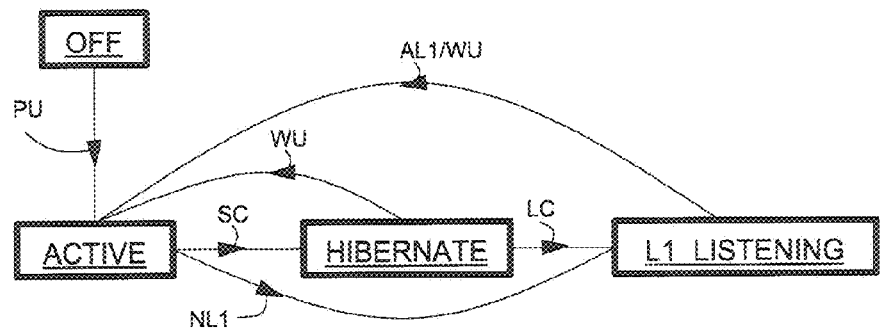
Figure 4:
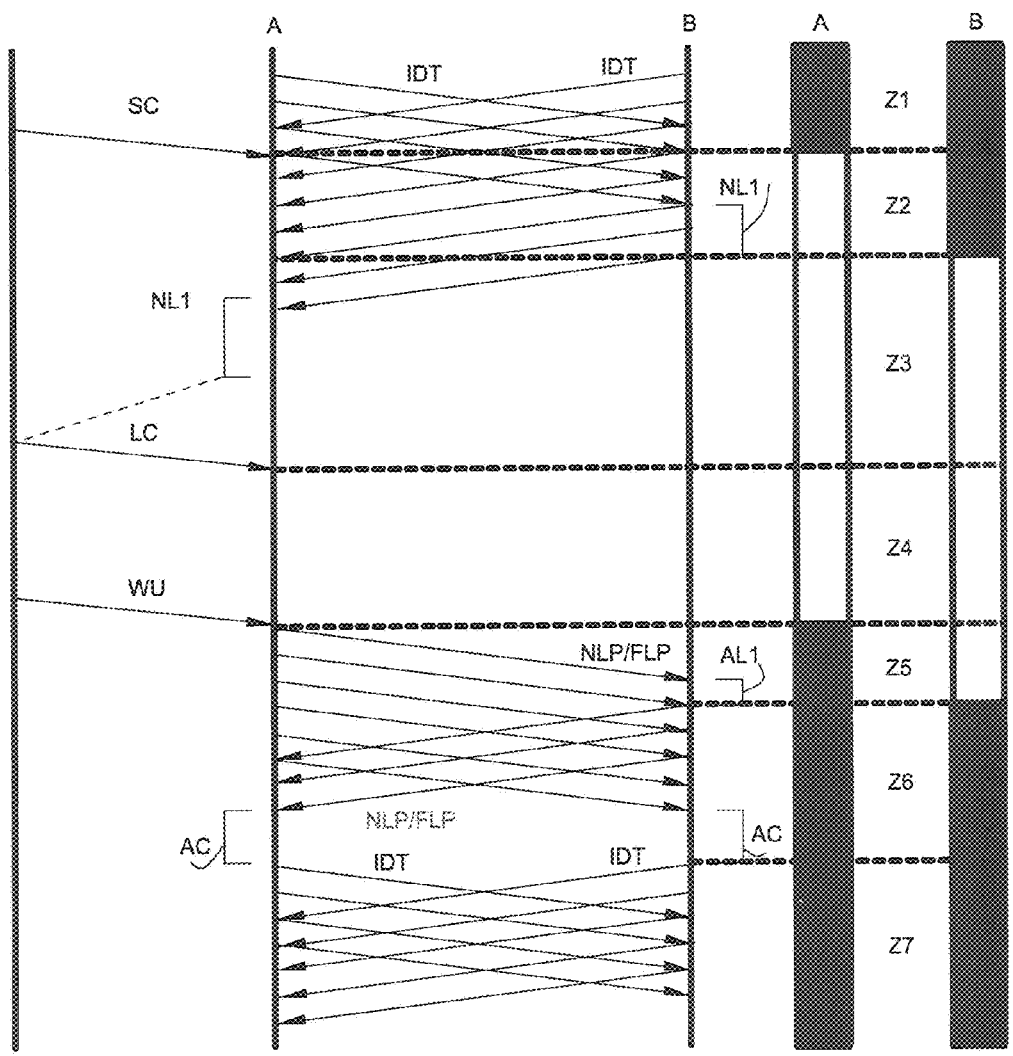
Figure 5:
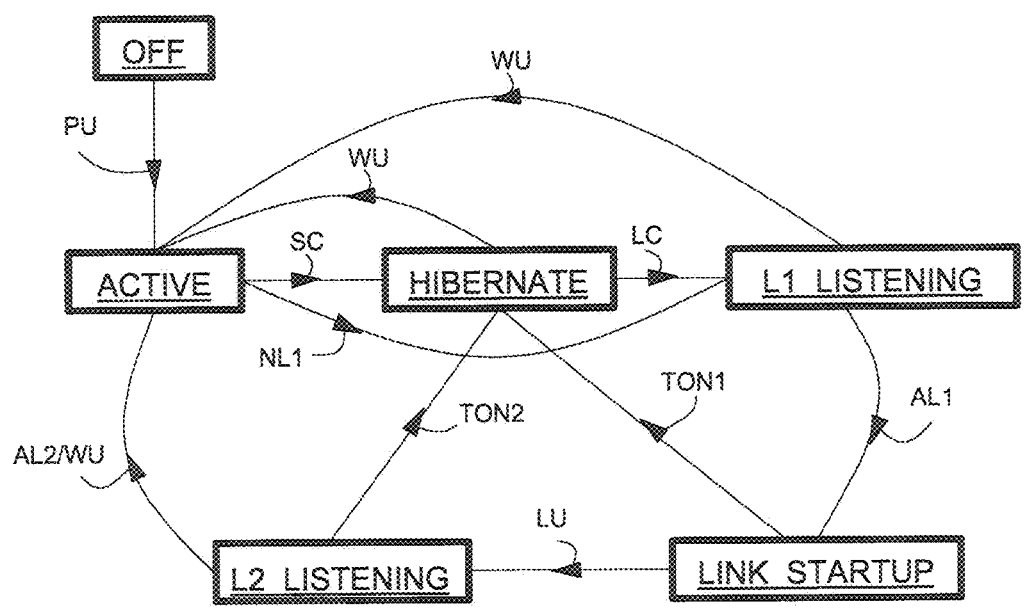
Figure 6:
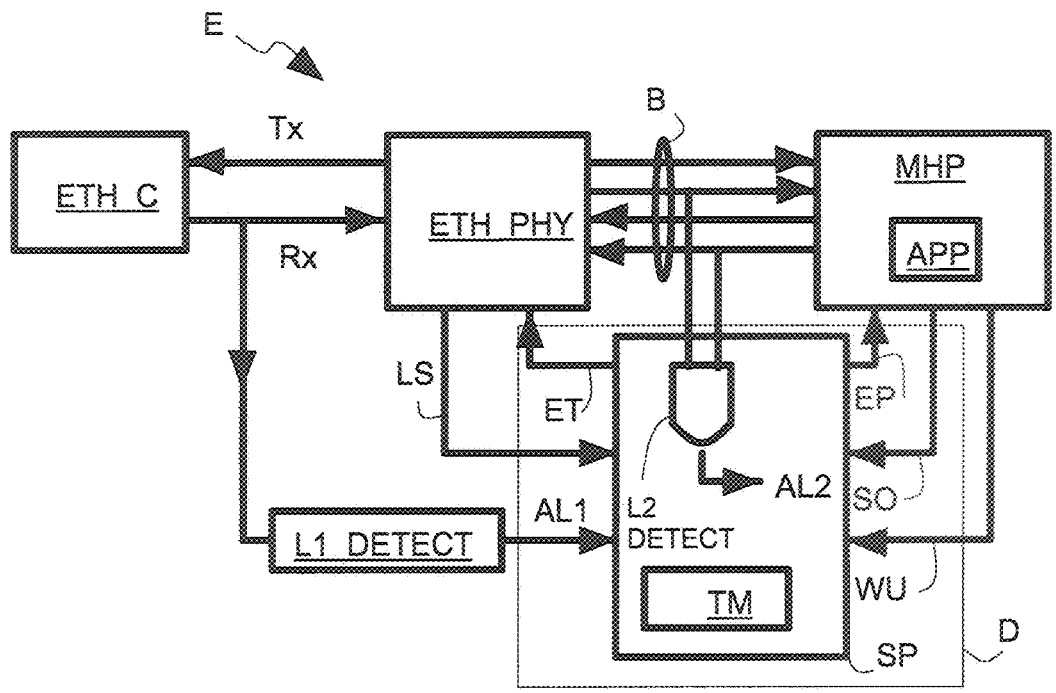
Figure 7:
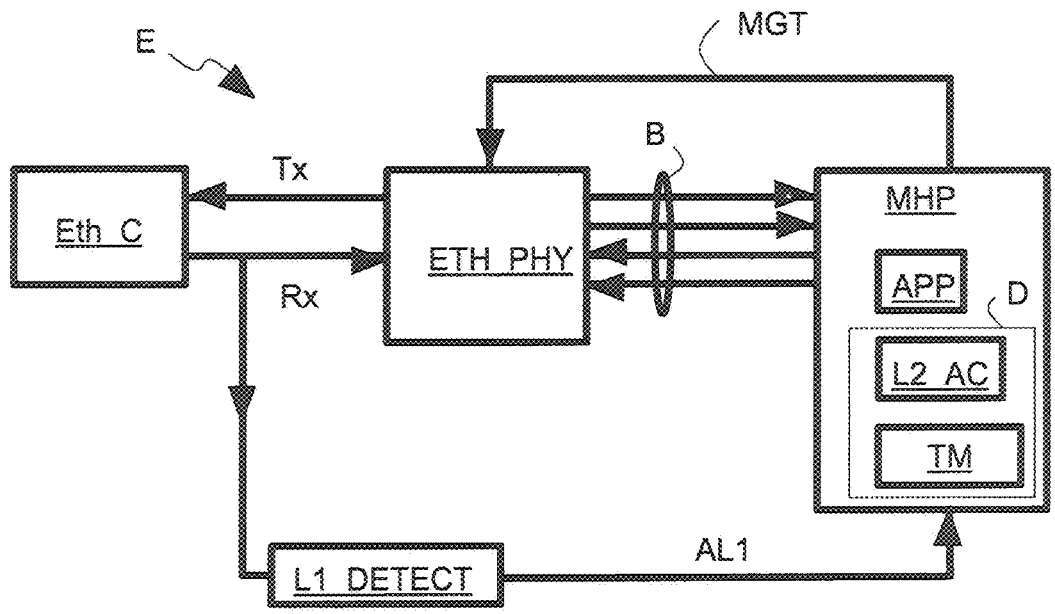

The features of the invention mentioned above, as well as others, will emerge more clearly from a reading of the following description of an example embodiment, said description being given in relation to the accompanying drawings, among which:

FIG. 1 shows a state diagram of the method of reducing the electrical consumption of an Ethernet interface according to the prior art, FIG. 2 shows a timing diagram illustrating the functioning of an Ethernet interface implementing the method of FIG. 1, FIG. 3 shows a state diagram of a method of reducing the electrical consumption of an Ethernet interface according to an embodiment of the present invention, FIG. 4 shows a timing diagram illustrating the functioning of an Ethernet interface according to the embodiment of the method in FIG. 3, FIG. 5 shows a state diagram of the method of reducing the electrical consumption of an Ethernet interface according to another embodiment of the present invention, FIG. 6 shows a block diagram of an embodiment of equipment hosting an Ethernet interface and that implements one of the methods according to the present invention, and FIG. 7 shows a block diagram of another embodiment of equipment hosting an Ethernet interface and that implements one of the methods according to the present invention.

The references in FIGS. 3 to 5 that are common with those in FIGS. 1 to 2 designate the same elements.

The method according to the invention introduces an operating mode of an Ethernet interface, called HIBERNATE, which is transient (over time) and in which the Ethernet interface ceases any sending of signal frames when a condition SC or inactivity of the interface is verified. The condition SC is satisfied if inactivity of the MAC layer of the interface is detected for a predetermined period T_L2L, typically one minute, starting as from the last detection of activity on the MAC layer or if a deactivation instruction emanates from a layer with a level higher than that of the MAC layer of the interface.

Preferably, during HIBERNATE mode, the Ethernet interface is deactivated. This feature enables the interface to switch into a low-consumption mode.

The Ethernet interface switches from HIBERNATE mode to L1_LISTENING mode when an LC condition is satisfied.

According to one embodiment, the LC condition is satisfied when an inactivity on the physical layer is detected during the period T_L1_INACTIVE, typically 250 ms, which starts as from the last activity on the physical layer thereof According to another embodiment, which may also be associated with the previous one, the LC condition is satisfied at the expiry of a period Eth_Toff, typically 10 s, starting as from the time when the Ethernet interface enters HIBERNATE mode. The period Eth_Toff is determined so as to ensure compatibility with distant equipment that does not implement the energy detect functionality, that is to say equipment that is not designed so that the Ethernet interface that it hosts functions either in ACTIVE mode or in L1_LISTENING mode.

The Ethernet interface switches from HIBERNATE to ACTIVATE mode following an activation instruction WU emanating from a layer with a level higher than the MAC layer of the interface, such as for example an application layer.

The Ethernet interface switches from L1_LISTENTING mode to ACTIVE mode when a condition AL1/WU is satisfied.

According to one embodiment, the condition AL1/WU is satisfied following the detection of an activity on the physical layer of the interface.

According to another embodiment, which may also be associated with the previous one, the condition AL1/WU is satisfied following an activation instruction WU emanating from a layer with a level higher than the MAC layer of the interface, such as for example an application layer.

The Ethernet interface switches from ACTIVE mode to L1_LISTENING mode following a detection of inactivity of the physical layer (event NL1) during a period T_L1_INACTIVE.

Moreover, the Ethernet interface switches to OFF mode as soon as the equipment that hosts it is powered down, whatever the mode, ACTIVE, HIBERNATE, L1_LISTENING, in which the Ethernet interface is situated.

FIG. 4 shows a timing diagram illustrating the functioning of an Ethernet interface implementing the embodiment of the method in FIG. 3.

Let us assume that the two items of equipment A and B are on standby and that each implements the energy detect functionality. The Ethernet interfaces ETHA and ETHB are situated in active mode (zone Z1) and exchange IDT frames.

Let us consider now that the interface ETHA has not detected any activity on the MAC layer thereof for a period equal to T_L2L, that is to say condition SC is satisfied. The interface ETHA switches into HIBERNATE mode. The interface ETHA is then deactivated and no longer sends any IDT frames, and any activity on the physical layer thereof is detected while being in a low-consumption mode. The interface ETHB continues to function in a nominal consumption mode given that it is still functioning in ACTIVATE mode (zone Z2).

As from the time when the Ethernet interface ETHB no longer receives an IDT frame from the Ethernet interface ETHA, the Ethernet interface ETHB detects that there is no longer any activity on its physical layer and initiates a counter NL1 initialised to the period T_L1_INACTIVE, typically 250 ms. During this period, the interface ETHB functions in ACTIVATE mode and continues to send IDT frames while listening whether it is receiving a new IDT frame. At the expiry of the period T_L1_INACTIVE (condition SC satisfied), the Ethernet interface ETHB switches from ACTIVATE mode to L1_LISTENING mode, that is to say in a low-consumption mode (zone 3).

As from the time when the Ethernet interface ETHA no longer receives an IDT frame from the Ethernet interface ETHB, the Ethernet interface ETHA detects that there is no longer any activity on the physical layer thereof and initiates a counter NL1 initialised to the period T_L1_INACTIVE, typically 250 ms. During this period, the interface ETHA functions in HIBENATE mode. At the expiry of the period T_L1_INACTIVE (condition LC satisfied), the Ethernet interface ETHA switches from HIBERNATE mode to L1_LISTENING mode and therefore remains in a low-consumption mode (zone 3). The interfaces ETHA and ETHB are then in L1_LISTENING mode (zone 4).

Les us consider now that an activation instruction WU has been sent by an application layer of the equipment A. The condition AL1/WU is satisfied at the interface ETHA, which then switches from L1_LISTENING mode to ACTIVATE mode and sends NPL/FLP frames relating to the link negotiation phase. The interface ETHB detects activity on the physical layer thereof (event AL1/WU), and then switches from L1_LISTENING mode to ACTIVATE mode in order to respond to the negotiation phase initiated by the interface ETHA.

Thus, although the two interfaces ETHA and ETHB were up till then in a low-consumption mode, an activation instruction emanating from a layer with a level higher than that of the MAC layer of the interface ETHA causes not only activation of the interface ETHA but also activation of the distant interface ETHB.

The two interfaces ETHA and ETHB then function in ACTIVATE mode as described in relation to FIG. 2.

The method described in relation to FIGS. 3 and 4 is designed to be implemented on the two Ethernet interfaces ETHA and ETHB. However, it may happen that one of the two items of equipment, for example B, implements neither this method nor even the energy detect functionality.

So that the electrical consumption reduction method nevertheless makes it possible to save on energy at the Ethernet interface that implements the method according to the present invention, the Ethernet interface ETHA switches from HIBERNATE mode to L1_LISTENING mode at the expiry of a period Eth_Toff starting as from the time when the Ethernet interface enters HIBERNATE mode. Thus the hardware means of the physical layer of the interface ETHB remain electrically supplied during zone Z3 (with reference to FIG. 4) and despite the fact that the interface ETHB then continues to send IDT frames, the interface ETHA switches from HIBERNATE mode to L1_LISTENING mode at the expiry of the period ETH_Toff.

FIG. 5 shows a state diagram of the method of reducing the electrical consumption of an Ethernet interface according to another embodiment of the present invention.

This embodiment is particularly advantageous when the electrical consumption is favoured compared with the reactivity of the establishment of the Ethernet link, that is to say with respect to the period necessary for activating the distant interfaces and for performing the phase of negotiation between these interfaces.

For this purpose, the condition AL1/WU of FIG. 3, which enables the Ethernet interface to switch from L1_LISTENING mode to ACTIVE mode, is limited to the activation instruction WU.

This is because, following the detection of an activity on its physical layer (event AL1), the interface switches from L1_LISTENING mode to a so-called negotiation mode referred to as LINK STARTUP rather than to ACTIVE mode as is the case in FIG. 3.

In LINK STARTUP mode, the Ethernet interface is activated and attempts to establish an Ethernet link with another distant Ethernet interface.

The Ethernet interface switches from LINK STARTUP mode to HIBERNATE mode at the expiry of a period Ton1 counted as from the time when the Ethernet interface enters LINK_STARTUP mode and determined so as to allow the time necessary for the Ethernet link to establish itself. In the contrary case, it enables the interface to switch to HIBERNATE mode.

The Ethernet interface switches from LINK STARTUP mode to a listening mode L2_LISTENING when the link is established (event LU). In L2_LISTENING mode, the interface is activated and any activity on the MAC layer thereof is detected.

The Ethernet interface switches from L2_LISTENING mode to HIBERNATE mode at the expiry of a predetermined period Ton2, typically 5 s, and starting as from the time when the Ethernet interface enters L2_LISTENING mode.

The interface switches from L2_LISTENING mode to ACTIVATE mode following an activation instruction WU emanating from a layer with a level higher than that of its MAC layer or following the detection AL2 of an activity on its MAC layer.

FIG. 6 shows a block diagram of an embodiment of an item of equipment that hosts an Ethernet interface and implements one of the methods according to the present invention described in relation to FIGS. 3 and 5.

The equipment E comprises hardware means for implementing the functionalities of the physical layer and MAC layer of an Ethernet interface.

The hardware means implementing the functionalities of the physical layer of the Ethernet interface are shown here by a set of electronic components normally referred to as an Ethernet physical chipset and referenced in FIG. 3 by ETH_PHY.

The hardware means that implement the functionalities of the MAC layer of the internet interface are represented here by a processor referenced MHP. Normally, this microprocessor also uses the layers with a level higher than the MAC layer of the Ethernet interface, such as an application layer referenced here APP.

The equipment E also comprises an Ethernet connector ETH_C provided for the connection of a cable and a detector L1_DETECT for detecting the activity of the physical layer of the Ethernet interface in the case where the equipment E fulfils the energy detect function. In the contrary case, this detector is added to the device D in order to implement the present invention.

The assembly ETH_PHY is connected firstly to the processor MHP by a bus B of the MII type, and secondly to the Ethernet connector ETH_C.

The detector L1_DETECT relies on a pulse detector NLP/FLP in accordance with standard 802.3 clause 28. It is based on discrete components, the input of which is connected to the link between the Ethernet connector ETH_C and the assembly ETH_PHY in the reception direction Rx. The output AL1 can be wired to an interrupt line of a microprocessor. Thus, when a frame is received by the Ethernet connector ETH_C, the output AL1 changes state, thereby signifying an activity on the physical layer of the Ethernet interface.

Thus, when a frame is received by the Ethernet connector ETH_C, it is transmitted to the assembly ETH_PHY in the direction Rx. This frame is then transmitted to the processor MHP via the bus B in the direction Rx. Conversely, when a frame is sent by the processor MHP via the bus B in the direction Tx, the frame is received by the assembly ETH_PHY. This frame is then transmitted to the Ethernet connector ETH_C in the direction Tx.

The equipment E comprises a device D for reducing the electrical consumption of the interface, which implements the method according to FIG. 3 or 5.

The device comprises a second processor SP, means TM for using the duration counters and a detector L2_DETECT for detecting the bidirectional activity of the MAC layer of the Ethernet internet.

The means TM store the durations T_L1_INACTIVE, Eth_ Toff, TON1, TON2 and T_L2L and trigger counters according to these durations as explained in FIGS. 3 and 5.

According to one embodiment, the detector L2_DETECT is a logic OR gate with two inputs connected to the bus B: one to the part of the bus relating to the transmission direction Tx and the other to the reception direction Rx. Thus, as soon as a frame is received or sent via the assembly ETH_PHY, the output of the OR gate goes to 1, thereby signifying an activity in one or other direction on the MAC layer of the Ethernet interface.

The second processor SP implements the method according to FIG. 3 or 5. For this purpose, it is connected to the output of the detector L1_DETECT so as to receive the output AL1 and to the bus B whether in the transmission direction Tx or reception direction Rx. The function of the logic OR gate is then performed by this processor.

The processor SP is also connected to the assembly ETH_PHY firstly in order to send to it a signal ET intended to either deactivate this assembly or to activate it in accordance with the method of the present invention, and secondly to receive from this assembly a signal LS that informs the processor of the result of a negotiation phase for establishing an Ethernet link between distant interfaces.

The second processor SP is also connected to the processor MHP. First of all, the processor SP is connected to the processor MHP in order to send to it a signal EP to indicate to this processor that it can switch into a low-consumption mode. This signal EP also indicates to the processor MHP that it should switch into nominal mode. The processor SP is connected to the processor MHP in order to receive from the latter a signal SO and a signal WU. The signal SO, which emanates from a layer with a higher level than that of the MAC layer of the interface, instructs the processor SP to switch the interface to HIBERNATE mode and the signal WU, which also emanates from a layer with a level higher than that of the MAC layer of the interface, instructs the processor SP to switch the Ethernet interface to ACTIVATE mode.

This embodiment is particularly advantageous since the processor SP, which does not need to be a very elaborate processor compared with the MHP processor, may be a processor with low electrical consumption, typically less than 50 mW.

This embodiment is suitable for equipment the purpose of which is to go "completely" on standby (cutting off electrical supply of hardware means that use the physical and MAC layers of the Ethernet interface) while providing awakening through their Ethernet interface. This is the case in particular with set top boxes. Thus the low-consumption modes (HIBERNATE, L1_LISTENING) afford complete stoppage of the assembly ETH_PHY and of the processor MHP while requiring a reduced consumption budget to awaken them.

FIG. 7 shows a block diagram of another embodiment of equipment hosting an Ethernet interface and which uses one of the methods according to the present invention described in relation to FIGS. 3 and 5.

The references in FIG. 7 that are common to the references in FIG. 6 designate the same elements.

According to this embodiment, the device D is fully integrated in the processor MHP and the processor is, connected to the assembly ETH_PHY by a management bus for the assembly ETC_PHY of the type for example MDC/MDIO normally used for activating and deactivating the physical layer of the Ethernet interface.

The detector L2_DETECT is here used in a programmed fashion (L2_AC).

The detector L1_DETECT is connected to the processor MHP so that, when a frame is received by the Ethernet connector ETH_C, the output AL1 changes state, signifying thereby an activity on the MAC layer of the Ethernet interface.

This embodiment is suited to equipment where the main processor (MHP) is always in activity, such as for example gateways, whether or not they be domestic. The advantage of this embodiment is to optimise the financial cost of the use of one of the methods according to the present invention since this method is integrated within a processor existing in current equipment.

The invention claimed is:

1. A method of reducing electrical consumption of an Ethernet interface (ETHA) switching from a so-called active mode (ACTIVE) in which the Ethernet interface is activated into a low-consumption mode when inactivity is detected on a physical layer thereof during a first predetermined period (T_L1_INACTIVE), wherein the Ethernet interface also switches into a low-consumption mode when inactivity is detected on a MAC layer thereof during a second predetermined period (T_L2L), and the Ethernet interface also switches from active mode (ACTIVE) to a transient mode (HIBERNATE) in which the Ethernet interface ceases all sending of signal frames either when inactivity on the MAC layer thereof is detected during the second predetermined period (T_L2L) beginning as from the last detection of activity on the MAC layer thereof or following an interface deactivation instruction emanating from a layer with a level higher than that of the MAC layer thereof.

2. The method according to claim 1, in which the interface functions also
   either in a so-called active mode (ACTIVE) in which the Ethernet interface is activated,
   in a so-called inactive mode (L1_LISTENING) in which the Ethernet interface is deactivated and any activity on its physical layer is detected,
   the Ethernet interface switching from active mode to inactive mode when inactivity on its physical layer is detected during the first predetermined period (T_L1_INACTIVE).

3. The method according to claim 1, in which the interface is deactivated when the Ethernet interface functions in the transient mode.

4. The method according to claim 1, in which the Ethernet interface switches from the transient mode (HIBERNATE) to the inactive mode (L1_LISTENING) when inactivity on the physical layer thereof is detected during the first predetermined period (T_L1_INACTIVE) beginning as from the last activity on the physical layer thereof.

5. The method according to claim 1, in which the Ethernet interface switches from the transient mode (HIBERNATE) to the inactive mode (L1_LISTENING) at the expiry of a period (Eth_Toff) beginning as from the time when the Ethernet interface enters the transient mode.

6. The method according to claim 1, in which the Ethernet interface switches from the transient mode (HIBERNATE) to active mode (ACTIVATE) following an activation instruction (WU) emanating from a layer with a level higher than that of the MAC layer thereof.

7. The method according to claim 1, in which the Ethernet interface switches from the inactive mode (L1_LISTENING) to the active mode (ACTIVE) following an activation instruction (WU) emanating from a layer with a level higher than that of the MAC layer thereof.

8. The method according to claim 1, in which the Ethernet interface switches from the active mode (ACTIVE) to the inactive mode (L1_LISTENING) following a detection of inactivity of the physical layer (NL1) thereof for a predetermined duration (T_L1_INACTIVE).

9. The method according to claim 1, in which the Ethernet interface switches from the inactive mode (L1_LISTENING) to the active mode (ACTIVE) following a detection of activity on the physical layer (AL1) thereof.

10. The method according to claim 1, in which, following a detection of activity on the physical layer (AL1) thereof the Ethernet interface switches from the inactive mode (L1_LISTENING) to a so-called negotiation mode (LINK STARTUP) in which the Ethernet interface is activated and attempts to establish an Ethernet link with a distant Ethernet interface.

11. The method according to claim 9, in which the Ethernet interface switches from the negotiation mode (LINK STARTUP) to the transient mode (HIBERNATE) at expiry of a third predetermined duration (Ton1) beginning as from the time when the Ethernet interface enters into the negotiation mode, said third period being predetermined so as to allow the time necessary for the Ethernet link to be established.

12. The method according to claim 9, in which the Ethernet interface switches from the negotiation mode (LINK STARTUP) to a listening mode (L2_LISTENING) in which the Ethernet interface is activated and any activity on the MAC layer thereof is detected.

13. The method according to claim 11, in which the Ethernet interface switches from the listening mode (L2_LISTENING) to the transient mode (HIBERNATE) at expiry of a fourth predetermined period (Ton2) beginning as from the time when the Ethernet interface enters into the listening mode.

14. The method according to claim 11, in which the Ethernet interface switches from the listening mode (L2_LISTENING) to the active mode (ACTIVATE) following an instruction (WU) emanating from a layer with a level higher than that of the MAC layer thereof or following detection of activity on the MAC layer (AL2) thereof.

15. A device for reducing the electrical consumption of an Ethernet interface (ETHA) hosted by an item of equipment (A), comprising
   a detector (L1_DETECT) for detecting the activity on the physical layer of the Ethernet interface,
   means (ET) for deactivating the Ethernet interface when inactivity on the physical layer thereof is detected during a first predetermined period (T_L1_INACTIVE),
   means (ET) for activating the Ethernet interface following an instruction (EP) emanating from a layer with a level higher than that of the MAC layer of the interface,
   wherein the device comprises
   a detector (L2_DETECT) for detecting bidirectional activity on the MAC layer of the Ethernet interface, and
   means (SP, SO, TM) for the Ethernet interface to cease any sending of signal frames when inactivity on the MAC layer thereof is detected during a predetermined period (T_L2L) beginning as from the last detection of activity on the MAC layer thereof or following a deactivation instruction (SO) emanating from a layer with a level higher than that of the MAC layer thereof.

16. The device according to claim 15, in which the detector (L2_DETECT) for detecting bidirectional activity on the MAC layer of the Ethernet interface fulfils a logic OR function with two inputs, one of the inputs being intended to detect reception of a frame on the MAC layer thereof and the other input being intended to detect sending of a frame on the MAC layer thereof.

17. An item of equipment hosting an Ethernet interface, comprising means (MHP, ETH_PHY, ETH_C) for implementing functionalities of a physical layer and a MAC layer of the Ethernet interface, comprising a dedicated processor (SP) configured for implementing the method according to claim 1.

18. An item of equipment hosting an Ethernet interface, comprising a main processor (MHP) and means (ETH_PHY, ETH_C) for implementing functionalities of a physical layer and a MAC layer of the Ethernet interface, wherein the main processor (MHP) implements a device according to claim 15.

* * * * *